(12) United States Patent
Muldoon et al.

(10) Patent No.: US 12,351,323 B2
(45) Date of Patent: Jul. 8, 2025

(54) HYBRID ELECTRIC ENGINE AND NACELLE SYSTEM

(71) Applicants: RTX Corporation, Farmington, CT (US); Rohr, Inc., Chula Vista, CA (US)

(72) Inventors: Marc J. Muldoon, Marlborough, CT (US); Murat Yazici, Glastonbury, CT (US); Brian Sherman, Chula Vista, CA (US)

(73) Assignees: RTX CORPORATION, Farmington, CT (US); ROHR, INC., Chula Vista, CA (US)

( * ) Notice: Subject to any disclaimer, the term of this patent is extended or adjusted under 35 U.S.C. 154(b) by 69 days.

(21) Appl. No.: 18/163,676

(22) Filed: Feb. 2, 2023

(65) Prior Publication Data

US 2024/0262515 A1     Aug. 8, 2024

(51) Int. Cl.
| | |
|---|---|
| B64D 27/24 | (2024.01) |
| B64D 15/12 | (2006.01) |
| B64D 27/10 | (2006.01) |
| B64D 29/00 | (2006.01) |
| F02C 6/14 | (2006.01) |
| B64D 27/02 | (2006.01) |

(52) U.S. Cl.
CPC .......... *B64D 27/24* (2013.01); *B64D 15/12* (2013.01); *B64D 27/10* (2013.01); *B64D 29/00* (2013.01); *F02C 6/14* (2013.01); *B64D 27/026* (2024.01)

(58) Field of Classification Search
CPC ........ B64D 27/24; B64D 15/12; B64D 27/10; B64D 29/00; B64D 27/026; F02C 6/14
See application file for complete search history.

(56) References Cited

U.S. PATENT DOCUMENTS

| | | | | |
|---|---|---|---|---|
| 8,931,740 | B2 * | 1/2015 | Nordin | B64C 3/26 |
| | | | | 244/134 R |
| 9,366,202 | B2 * | 6/2016 | Lacko | F02K 1/64 |
| 9,567,089 | B2 * | 2/2017 | Layland | B64D 29/06 |
| 9,714,627 | B2 * | 7/2017 | Lacko | F02C 7/20 |
| 9,783,313 | B2 * | 10/2017 | Lacko | B64D 27/40 |
| 9,885,253 | B2 * | 2/2018 | Soria | B64D 29/06 |
| 9,897,007 | B2 * | 2/2018 | Soria | F02K 1/72 |

(Continued)

OTHER PUBLICATIONS

Partial European Search Report for EP Application No. 24155383.3; Mailing Date, Jul. 3, 2024.

(Continued)

*Primary Examiner* — Medhat Badawi
(74) *Attorney, Agent, or Firm* — CANTOR COLBURN LLP

(57) ABSTRACT

A propulsion system of an aircraft includes a hybrid electric gas turbine engine, and a nacelle at least partially enclosing the hybrid electric gas turbine engine. The nacelle includes a first nacelle half and a second nacelle half. Each of the first nacelle half and the second nacelle half include an outer nacelle sleeve, an inner nacelle sleeve radially offset from the outer nacelle sleeve such that a flowpath is defined between the outer nacelle sleeve and the inner nacelle sleeve, and an upper bifurcation connecting the outer nacelle sleeve to the inner nacelle sleeve at an upper end of the nacelle. The flowpath is circumferentially continuous between the upper bifurcation of the first nacelle half and the upper bifurcation of the second nacelle half.

17 Claims, 4 Drawing Sheets

(56) References Cited

U.S. PATENT DOCUMENTS

| | | | |
|---|---|---|---|
| 9,903,313 B2* | 2/2018 | Aten | F02K 1/72 |
| 10,006,375 B1* | 6/2018 | Wagner | B64D 31/09 |
| 10,093,429 B2* | 10/2018 | Lacko | B64D 29/02 |
| 10,107,191 B2* | 10/2018 | Gilson | F02C 3/107 |
| 10,167,741 B2* | 1/2019 | Lacko | B64C 1/1453 |
| 10,507,931 B2* | 12/2019 | Soria | B32B 7/12 |
| 10,734,953 B1* | 8/2020 | Maxim | H03F 1/083 |
| 10,759,541 B2* | 9/2020 | Lacko | B64D 27/40 |
| 11,208,970 B2* | 12/2021 | Aziz | F02K 1/625 |
| 11,242,150 B2* | 2/2022 | Sakala | H10K 30/20 |
| 11,261,787 B2* | 3/2022 | Ganiger | F02C 7/047 |
| 11,428,190 B2* | 8/2022 | Grall | F02K 1/72 |
| 11,548,648 B2* | 1/2023 | George | B64D 15/12 |
| 11,618,574 B2* | 4/2023 | Linde | B64D 15/12 244/134 D |
| 11,698,032 B1* | 7/2023 | Meslioui | F02C 7/36 415/89 |
| 11,706,848 B2* | 7/2023 | Kessler | H05B 3/265 219/645 |
| 11,725,542 B2* | 8/2023 | Porco | B64D 27/10 29/426.1 |
| 11,753,968 B2* | 9/2023 | Nikolaus | F02K 1/827 415/119 |
| 11,891,185 B2* | 2/2024 | Boileau | B64D 29/06 |
| 11,964,768 B2* | 4/2024 | Paulson | B64D 15/12 |
| 12,030,648 B2* | 7/2024 | Goodfellow-Jones | B64D 15/08 |
| 2005/0038418 A1* | 2/2005 | Altshuler | A61B 18/203 606/9 |
| 2008/0087371 A1* | 4/2008 | Friedrich | E04H 12/02 156/166 |
| 2011/0016778 A1 | 1/2011 | Musokhranov | |
| 2011/0167781 A1 | 7/2011 | Maheshwari | |
| 2013/0043342 A1* | 2/2013 | Nordin | H05B 3/145 244/1 A |
| 2014/0034414 A1* | 2/2014 | Burkett | B64D 15/12 219/205 |
| 2015/0098810 A1* | 4/2015 | Soria | B64D 29/06 415/200 |
| 2015/0143796 A1* | 5/2015 | Lacko | F02K 1/766 60/226.2 |
| 2015/0308291 A1* | 10/2015 | Brown | B64D 29/08 415/182.1 |
| 2016/0069297 A1* | 3/2016 | Sawyers-Abbott | F02K 1/72 415/69 |
| 2016/0201600 A1* | 7/2016 | Charron | B64D 29/00 239/265.19 |
| 2017/0240288 A1* | 8/2017 | Pautis | B64D 27/16 |
| 2017/0362957 A1* | 12/2017 | Lu | F01D 25/24 |
| 2019/0316545 A1 | 10/2019 | Heau et al. | |
| 2019/0389589 A1* | 12/2019 | Sakala | H10K 30/20 |
| 2020/0392859 A1 | 12/2020 | Turner | |
| 2021/0003096 A1* | 1/2021 | Guillemant | F02K 1/72 |
| 2021/0129998 A1* | 5/2021 | Goodfellow-Jones | B64D 15/08 |
| 2021/0172333 A1* | 6/2021 | Suciu | F01D 15/10 |
| 2021/0231057 A1* | 7/2021 | Livebardon | F02K 1/827 |
| 2021/0310440 A1* | 10/2021 | Chilukuri | B64D 29/06 |
| 2021/0316872 A1* | 10/2021 | Lacko | B64D 29/08 |
| 2021/0323685 A1* | 10/2021 | Kupratis | F02C 6/00 |
| 2022/0348341 A1* | 11/2022 | Winter | F02C 6/00 |
| 2022/0403776 A1* | 12/2022 | Muldoon | F01D 21/006 |
| 2022/0412268 A1* | 12/2022 | Greenberg | F02C 7/36 |
| 2023/0138442 A1* | 5/2023 | Muldoon | F02C 9/52 60/785 |
| 2023/0139529 A1* | 5/2023 | Baig | B64D 31/18 244/55 |
| 2023/0211889 A1* | 7/2023 | Wang | B64D 27/10 244/53 R |
| 2023/0282848 A1* | 9/2023 | Wang | B60L 58/30 60/773 |
| 2024/0025556 A1* | 1/2024 | Rawdon | B64F 1/36 |
| 2024/0061444 A1* | 2/2024 | Henck | B64D 15/12 |
| 2024/0174368 A1* | 5/2024 | Cassagne | B64D 27/24 |
| 2024/0262515 A1* | 8/2024 | Muldoon | B64D 27/10 |

OTHER PUBLICATIONS

Extended European Search Report for EP Application No. 24155383.3, dated Sep. 25, 2024, pp. 1-11.

* cited by examiner

HYBRID ELECTRIC ENGINE AND NACELLE SYSTEM

BACKGROUND

Exemplary embodiments of the present disclosure pertain to the art of aircraft propulsion, and more specifically to aircraft utilizing a hybrid electric gas generator.

In the quest to design more efficient aircraft propulsion systems two technologies that have shown significant opportunity are advanced nacelles and hybrid-electric gas generators. Advanced nacelles can contribute to lower fuel burn by reducing drag and weight. Hybrid-electric gas generators use electrical power instead of combustion for power conditions where combustion is less efficient and also by electrically transferring excess power between engine spools or to charge batteries. A goal of hybrid-electric designers is to minimize the size and quantity of electrical components so that the added weight does not offset the gains offered by electric power.

BRIEF DESCRIPTION

In one embodiment, a propulsion system of an aircraft includes a hybrid electric gas turbine engine; and a nacelle at least partially enclosing the hybrid electric gas turbine engine. The nacelle includes a first nacelle half and a second nacelle half. Each of the first nacelle half and the second nacelle half include an outer nacelle sleeve, an inner nacelle sleeve radially offset from the outer nacelle sleeve such that a flowpath is defined between the outer nacelle sleeve and the inner nacelle sleeve, and an upper bifurcation connecting the outer nacelle sleeve to the inner nacelle sleeve at an upper end of the nacelle. The flowpath is circumferentially continuous between the upper bifurcation of the first nacelle half and the upper bifurcation of the second nacelle half.

Additionally or alternatively, in this or other embodiments the hybrid electric gas turbine engine includes a gas turbine engine and an electric motor operably connected to the gas turbine engine to supplement operation of the gas turbine engine.

Additionally or alternatively, in this or other embodiments an electrically powered anti-ice system is configured to prevent ice accumulation at the propulsion system.

Additionally or alternatively, in this or other embodiments the anti-ice system is powered by electrical power generated by the hybrid electric gas turbine engine.

Additionally or alternatively, in this or other embodiments the anti-ice system is powered by one or more of a battery, capacitor or electric motor of the hybrid electric gas turbine engine.

Additionally or alternatively, in this or other embodiments the anti-ice system includes a plurality of resistive heating elements arrayed around one or more of the nacelle and the hybrid electric gas turbine engine.

Additionally or alternatively, in this or other embodiments the plurality of resistive heating elements includes one or more carbon nanotube structures.

In another embodiment, a propulsion system of an aircraft includes a hybrid electric gas turbine engine, a nacelle at least partially enclosing the hybrid electric gas turbine engine, and an electrically powered anti-ice system configured to prevent ice accumulation at the propulsion system. The anti-ice system is powered by electrical power generated by the hybrid electric gas turbine engine.

Additionally or alternatively, in this or other embodiments the hybrid electric gas turbine engine includes a gas turbine engine and an electric motor operably connected to the gas turbine engine to supplement operation of the gas turbine engine.

Additionally or alternatively, in this or other embodiments the anti-ice system is powered by one or more of a battery, capacitor or electric motor of the hybrid electric gas turbine engine.

Additionally or alternatively, in this or other embodiments the anti-ice system includes a plurality of resistive heating elements arrayed around one or more of the nacelle and the hybrid electric gas turbine engine.

Additionally or alternatively, in this or other embodiments the plurality of resistive heating elements includes one or more carbon nanotube structures.

Additionally or alternatively, in this or other embodiments the plurality of resistive heating elements are embedded in the material of the nacelle.

Additionally or alternatively, in this or other embodiments the nacelle includes a first nacelle half and a second nacelle half. Each of the first nacelle half and the second nacelle half include an outer nacelle sleeve, an inner nacelle sleeve radially offset from the outer nacelle sleeve such that a flowpath is defined between the outer nacelle sleeve and the inner nacelle sleeve, and an upper bifurcation connecting the outer nacelle sleeve to the inner nacelle sleeve at an upper end of the nacelle. The flowpath is circumferentially continuous between the upper bifurcation of the first nacelle half and the upper bifurcation of the second nacelle half.

In yet another embodiment, a propulsion system of an aircraft includes a hybrid electric gas turbine engine and a nacelle at least partially enclosing the hybrid electric gas turbine engine. The nacelle includes a first nacelle half and a second nacelle half. Each of the first nacelle half and the second nacelle half include an outer nacelle sleeve, an inner nacelle sleeve radially offset from the outer nacelle sleeve such that a flowpath is defined between the outer nacelle sleeve and the inner nacelle sleeve, and an upper bifurcation connecting the outer nacelle sleeve to the inner nacelle sleeve at an upper end of the nacelle. The flowpath is circumferentially continuous between the upper bifurcation of the first nacelle half and the upper bifurcation of the second nacelle half. An electrically powered anti-ice system is configured to prevent ice accumulation at the propulsion system. The anti-ice system is powered by electrical power generated by the hybrid electric gas turbine engine.

Additionally or alternatively, in this or other embodiments the hybrid electric gas turbine engine includes a gas turbine engine and an electric motor operably connected to the gas turbine engine to supplement operation of the gas turbine engine.

Additionally or alternatively, in this or other embodiments the anti-ice system is powered by one or more of a battery, capacitor or electric motor of the hybrid electric gas turbine engine.

Additionally or alternatively, in this or other embodiments the anti-ice system includes a plurality of resistive heating elements arrayed around one or more of the nacelle and the hybrid electric gas turbine engine.

Additionally or alternatively, in this or other embodiments the plurality of resistive heating elements includes one or more carbon nanotube structures.

Additionally or alternatively, in this or other embodiments the plurality of resistive heating elements are embedded in the material of the nacelle.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A detailed description of one or more embodiments of the disclosed apparatus, system, and method are presented herein by way of exemplification and not limitation with reference to the Figures.

Figure 1A:
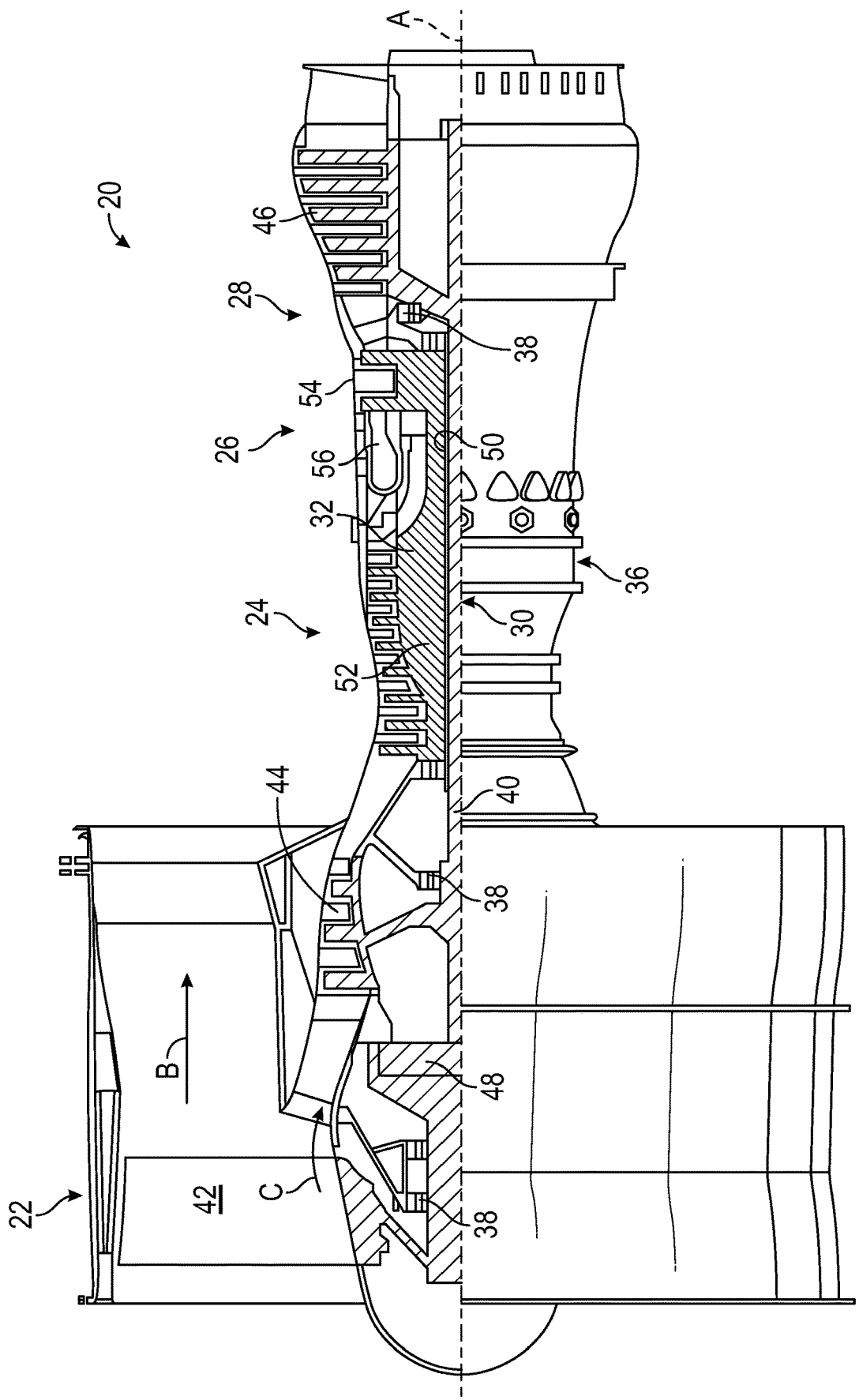
FIG. 1A is a partial cross-sectional view of a gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 1B:
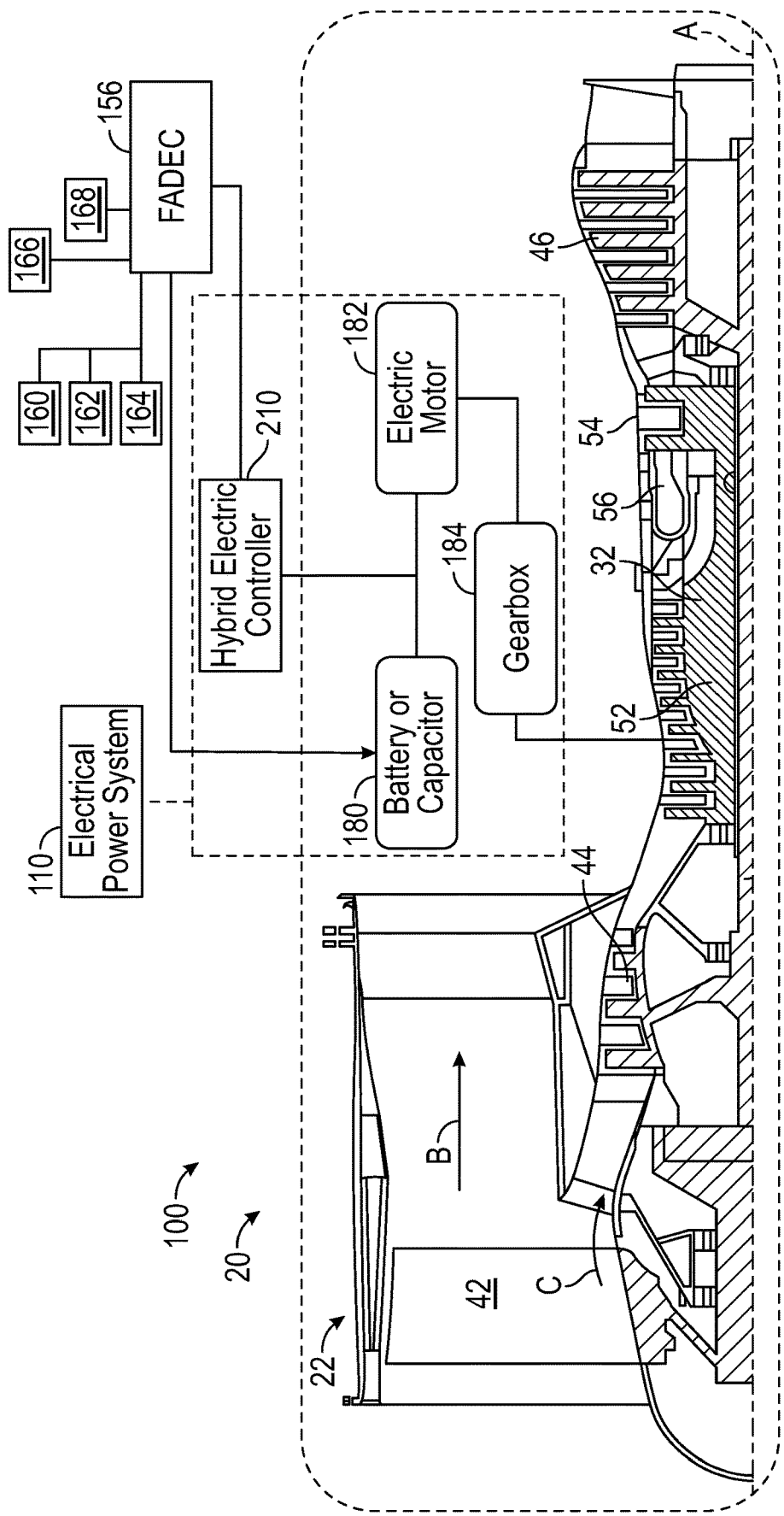
FIG. 1B is a partial cross-sectional view of a hybrid electric gas turbine engine according to one or more embodiments described herein.

FIG. 1B is a partial cross-sectional view of a hybrid electric gas turbine engine (also referred to as hybrid electric propulsion system 100) according to one or more embodiments described herein. The hybrid electric propulsion system 100 includes the gas turbine engine 20 operably coupled to an electrical power system 110 as part of a hybrid electric aircraft in accordance with one non-limiting embodiment of the present disclosure. In this embodiment, the electrical power system 110 has a power source 180 (illustrated as battery or capacitor 180) such as a battery, a super capacitor, an ultra-capacitor or an equivalent thereof, which supplies power to a motor 182, which is connected to an engine accessory gearbox 184 that is operably coupled to the high speed spool 32 such that the motor 182, when operated will provide power assist to the high speed spool 32 via the accessory gearbox 184. In other words, the accessory gearbox 184 will have at least one component (e.g., a gear train or other equivalent device) operably coupled to the high speed spool 32 and the motor 182 such that operation of the motor 182 will rotate the component which in turn will rotate the high speed spool 32. The power assist to the high speed spool 32 via the motor 182 will add enough stability to the high pressure compressor in order to allow, for example, re-starting without external power assist which may be provided by an auxiliary power unit (APU).

In one non-limiting embodiment, the motor 182 may be configured to provide power assist to the high speed spool 32. In some embodiments, the motor 182 may be configured to provide power assist to the high speed spool 32 in order to expand an in-flight re-start envelope. In yet another example, the motor 182 may be configured to provide power assist to the low speed spool 30. For example, in an alternative embodiment, the motor 182 may be operatively coupled to the low speed spool 30 via accessory gearbox 184 in order to provide additional thrust to the engine 20. According to one or more examples, each of the low speed spool 30 and the high speed spool 32 can have a dedicated motor (e.g., the motor 182) operatively coupled thereto via a dedicated gearbox (e.g., the gearbox 184).

According to an embodiment, the power source 180 and the motor 182 are under the full authority of a full authority digital engine control (FADEC) 156, which controls the power source and the engine. The FADEC 156 is an example of a controller that can include a processing system 160, a memory system 162, and an input/output interface 164. The processing system 160 can include any type or combination of central processing unit (CPU), including one or more of: a microprocessor, a digital signal processor (DSP), a microcontroller, an application specific integrated circuit (ASIC), a field programmable gate array (FPGA), or the like. Thus, the FADEC 156 can be said to include processing circuitry. The memory system 162 can store data and instructions that are executed by the processing system 160. In embodiments, the memory system 162 may include random access memory (RAM), read only memory (ROM), or other electronic, optical, magnetic, or any other computer readable medium onto which is stored data and algorithms in a non-transitory form. The input/output interface 164 is configured to collect sensor data from the one or more system sensors and interface with various components and subsystems, such as components of motor drive electronics, rectifier electronics, an energy storage management system, an integrated fuel control unit, actuators, and/or other components of the hybrid electric propulsion system 100. The FADEC 156 provides a means for controlling hybrid electric system control effectors 168 based on a power transfer control 166 that is dynamically updated during operation of the hybrid electric propulsion system 100. The means for controlling the hybrid electric system control effectors 168 can be otherwise subdivided, distributed, or combined with other control elements.

The FADEC 156 can also include various operational controls, such as a power transfer control 166 that controls hybrid electric system control effectors 168. The power transfer control 166 can apply control laws and access/update models to determine how to control and transfer power to and from the hybrid electric system control effectors 168. For example, sensed and/or derived parameters related to speed, flow rate, pressure ratios, temperature, thrust, and the like can be used to establish operational schedules and transition limits to maintain efficient operation of the gas turbine engine 20.

Additionally or alternatively, the hybrid electric propulsion system 100 can include a hybrid electric controller 210, which may be integrated into or separate from the FADEC 156. The hybrid electric controller 210 is communicatively coupled to the power source 180, the motor 182, and/or any other suitable components. The features and functionality of the hybrid electric controller 210 are described in more detail herein with respect to FIG. 2.

As shown in FIG. 1B, the lines connecting the components (e.g., the hybrid electric controller 210, the FADEC 156, the electric motor 182, etc.) form a bus (i.e., a communication bus) for transmitting/receiving data among the components. For example, one or more of the components can include a receiver for receiving data, a transmitter for transmitting data, and/or a transceiver for transmitting and receiving data via the bus.

An aircraft can selectively power a hybrid electric engine, such as the gas turbine engine 20 associated with hybrid electric propulsion system 100 of FIG. 1B (e.g., hybrid electric gas turbine engine), by providing electric power from a battery source and/or liquid fuel (jet fuel). During certain stages during a flight plan (e.g., taxi, cruise), electric power may be more efficient. However, during other stages (e.g., takeoff, climb), it may be more efficient to power the engine with liquid fuel. For example, during taxi, electric power may be more efficient, and thus the battery may be utilized to power the hybrid electric engine during taxi.

Figure 2:
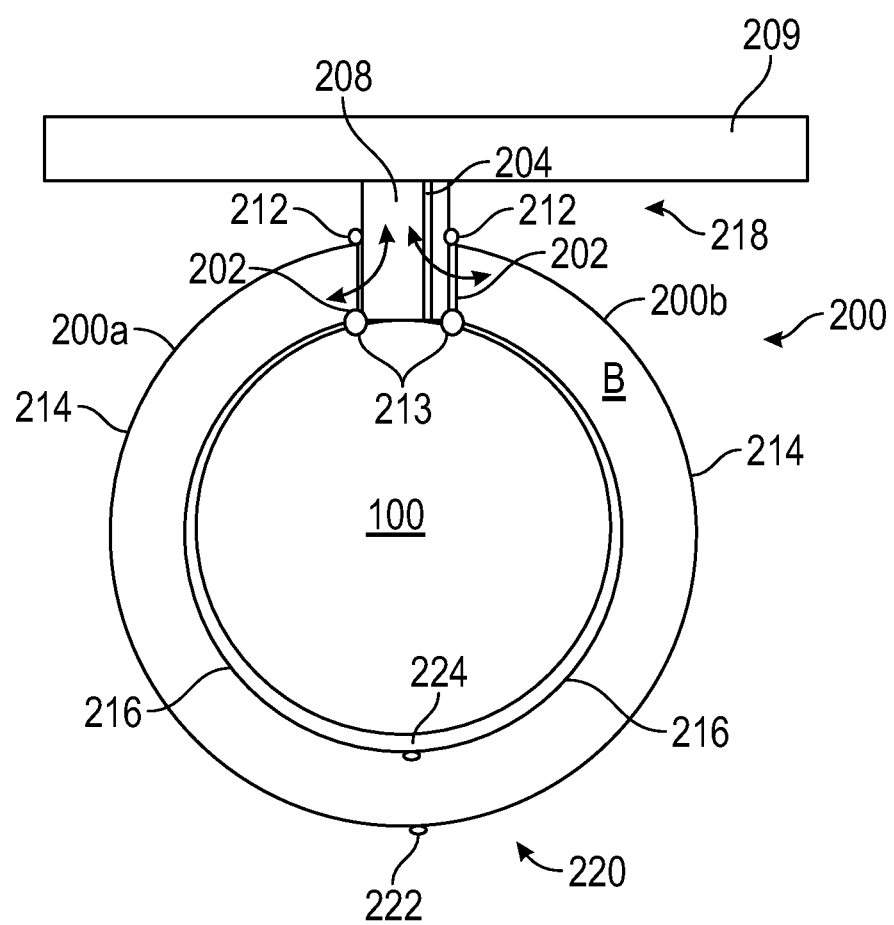
FIG. 2 is a cross-sectional illustration of an embodiment of an engine and nacelle assembly.

Referring now to FIG. 2, illustrated is a nacelle 200 that extends circumferentially around the hybrid electric propulsion system 100 (including gas turbine engine 20) and at least partially encloses the hybrid electric propulsion system 100. In some embodiments, such as illustrated in FIG. 1A, the nacelle 200 is configured to at least partially define the bypass flowpath B. The nacelle 200 includes a first nacelle half 200a and a second nacelle half 200b located at opposite lateral sides of the hybrid electric propulsion system 100. The nacelle 200 includes an upper bifurcation 202 separating the first nacelle half 200a and the second nacelle half 200b, and through which pathways 204 for electrical power, fluids, fuel or the like are routed. Further, the upper bifurcation 202 houses a pylon 208 by which the hybrid electric propulsion system 100 is attached to an aircraft structure, such as a wing 209 or another engine mounting surface (e.g., fuselage, empennage, etc.). The nacelle 200 includes an outer nacelle sleeve 214 and an inner nacelle sleeve 216 located radially inboard of and spaced apart from the outer nacelle sleeve 214. The outer nacelle sleeve 214 and the inner nacelle sleeve 216 are independently movable about an outer sleeve hinge 212 and an inner sleeve hinge 213, respectively, between a closed position enclosing the hybrid electric propulsion system 100 and an opened position allowing access to the hybrid electric propulsion system 100 by, for example, a service technician. The first nacelle half 200a and the second nacelle half 200b each include an outer nacelle sleeve 214 and an inner nacelle sleeve 216 defining the bypass flowpath B therebetween. The upper bifurcation 202 extends between the outer nacelle sleeve 214 and the inner nacelle sleeve 216 at an upper nacelle end 218 closest to the pylon 208. At a lower nacelle end 220, opposite the upper nacelle end 218, the outer nacelle sleeves 214 are secured to one another by an outer nacelle latch 222, and the inner nacelle sleeves 216 are secured to one another by an inner nacelle latch 224. The nacelle 200 is absent a lower bifurcation, such that the bypass flowpath B extends circumferentially continuously between the upper bifurcation 202 of the first nacelle half 200a and the upper bifurcation 202 of the second nacelle half 200b.

Figure 3:
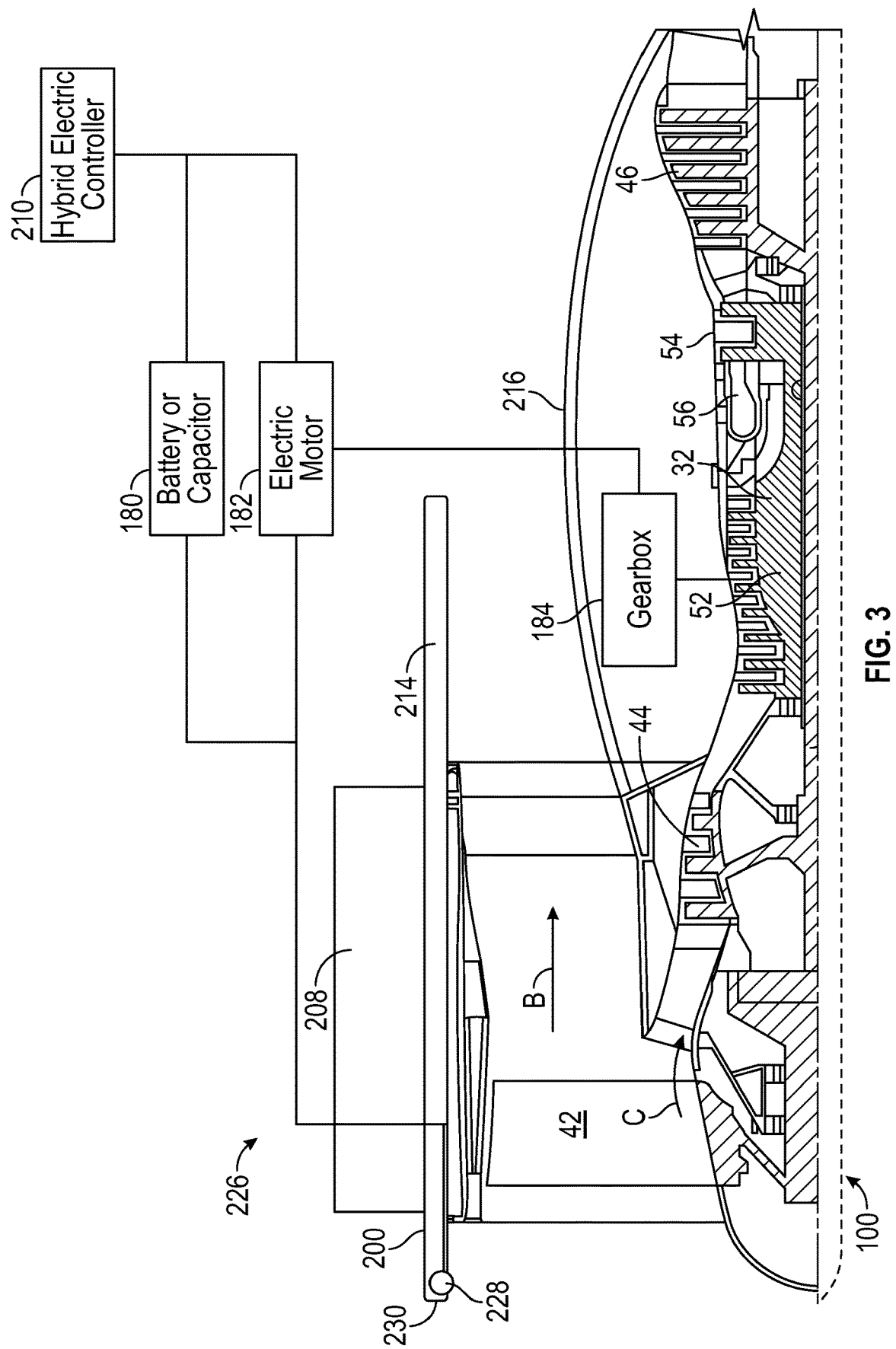
FIG. 3 is a schematic illustration of an anti-ice system of a hybrid gas turbine engine.

Referring now to FIG. 3, an anti-ice system 226 is operably connected to the nacelle 200 and the hybrid electric propulsion system 100 to prevent ice accumulation on the nacelle 200 and the hybrid electric propulsion system 100 (e.g., gas turbine engine 20). The anti-ice system 226 uses resistive heating elements 228 operably connected to the hybrid electric propulsion system 100, which provides electrical power to the resistive heating elements 228. The resistive heating elements 228 may be powered by, for example, the battery 180 or the electric motor 182, which may be co-located with the gas turbine engine 20 inside of the nacelle 200, or may alternatively be located remotely from the nacelle 200 at another location on the aircraft.

The resistive heating elements 228 are arrayed around the nacelle 200 and at selected components of the gas turbine engine 20, such that when the resistive heating elements 228 are activated and heated, the temperature of the portions of the nacelle 200 and the selected components of the gas turbine engine 20 increases to prevent accumulation of ice at those locations. In some embodiments the resistive heating elements 228 are formed from a highly electrically-conductive material, such as for example, carbon nanotubes. In some embodiments, such as shown in FIG. 3, the resistive heating elements 228 are located at an inlet end 230 of the outer nacelle sleeve 214 and are arrayed around a circumference or perimeter of the inlet end 230. In some embodiments, the outer nacelle sleeve 214 is formed from a composite material, such as a carbon fiber or glass fiber reinforced material. In such embodiments, the carbon nanotubes or other highly electrically-conductive material is embedded in the composite material.

The use of a hybrid electric propulsion system 100 paired with the nacelle 200 and electrical anti-ice system 226 uses significantly less energy and is compact relative to traditional anti-ice systems. Further, this allows for elimination of the traditional lower bifurcation in the nacelle, which improves performance via drag reduction and weight reduction.

The efficient carbon nano tube anti-ice device utilizes less energy than traditional pneumatic systems, but if extra electrical components are being added just for this purpose, much or all of the benefit is negated by the added weight. In the case of a hybrid-electric system, however, the required electrical components are already in place and compensated by other benefits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A propulsion system of an aircraft, comprising:
 a hybrid electric gas turbine engine; and
 a nacelle at least partially enclosing the hybrid electric gas turbine engine, the nacelle including:
  a first nacelle half; and
  a second nacelle half;
  wherein each of the first nacelle half and the second nacelle half include:
   an outer nacelle sleeve;
   an inner nacelle sleeve radially offset from the outer nacelle sleeve such that a flowpath is defined between the outer nacelle sleeve and the inner nacelle sleeve; and
   an upper bifurcation connecting the outer nacelle sleeve to the inner nacelle sleeve at an upper end of the nacelle;
   wherein the flowpath is circumferentially continuous between the upper bifurcation of the first nacelle half and the upper bifurcation of the second nacelle half.

2. The propulsion system of claim 1, wherein the hybrid electric gas turbine engine includes:
 a gas turbine engine; and
 an electric motor operably connected to the gas turbine engine to supplement operation of the gas turbine engine.

3. The propulsion system of claim 1, further comprising an electrically powered anti-ice system configured to prevent ice accumulation at the propulsion system.

4. The propulsion system of claim 3, wherein the anti-ice system is powered by electrical power generated by the hybrid electric gas turbine engine.

5. The propulsion system of claim 3, wherein the anti-ice system is powered by one or more of a battery, capacitor or electric motor of the hybrid electric gas turbine engine.

6. The propulsion system of claim 3, wherein the anti-ice system includes a plurality of resistive heating elements arrayed around one or more of the nacelle and the hybrid electric gas turbine engine.

7. The propulsion system of claim 6, wherein the plurality of resistive heating elements includes one or more carbon nanotube structures.

8. A propulsion system of an aircraft comprising:
 a hybrid electric gas turbine engine;
 a nacelle at least partially enclosing the hybrid electric gas turbine engine; and
 an electrically powered anti-ice system configured to prevent ice accumulation at the propulsion system;
 wherein the anti-ice system is powered by electrical power generated by the hybrid electric gas turbine engine;
 wherein the hybrid electric gas turbine engine includes:
  a gas turbine engine; and
  an electric motor operably connected to the gas turbine engine to supplement operation of the gas turbine engine;
 wherein the anti-ice system includes a plurality of resistive heating elements arrayed around the nacelle at an inlet end of a fan section of the gas turbine engine;
 wherein the nacelle includes:
  a first nacelle half; and a second nacelle half;
wherein each of the first nacelle half and the second nacelle half include:
an outer nacelle sleeve;
an inner nacelle sleeve radially offset from the outer nacelle sleeve such that a flowpath is defined between the outer nacelle sleeve and the inner nacelle sleeve; and
an upper bifurcation connecting the outer nacelle sleeve to the inner nacelle sleeve at an upper end of the nacelle;
wherein the flowpath is circumferentially continuous between the upper bifurcation of the first nacelle half and the upper bifurcation of the second nacelle half.

9. The propulsion system of claim 8 wherein the anti-ice system is powered by one or more of a battery, capacitor or electric motor of the hybrid electric gas turbine engine.

10. The propulsion system of claim 8, wherein the plurality of resistive heating elements includes one or more carbon nanotube structures.

11. The propulsion system of claim 8, wherein the plurality of resistive heating elements are embedded in the material of the nacelle.

12. A propulsion system of an aircraft, comprising:
a hybrid electric gas turbine engine;
a nacelle at least partially enclosing the hybrid electric gas turbine engine, the nacelle including:
a first nacelle half; and
a second nacelle half;
wherein each of the first nacelle half and the second nacelle half include:
an outer nacelle sleeve;
an inner nacelle sleeve radially offset from the outer nacelle sleeve such that a flowpath is defined between the outer nacelle sleeve and the inner nacelle sleeve; and
an upper bifurcation connecting the outer nacelle sleeve to the inner nacelle sleeve at an upper end of the nacelle;
wherein the flowpath is circumferentially continuous between the upper bifurcation of the first nacelle half and the upper bifurcation of the second nacelle half; and
an electrically powered anti-ice system configured to prevent ice accumulation at the propulsion system;
wherein the anti-ice system is powered by electrical power generated by the hybrid electric gas turbine engine.

13. The propulsion system of claim 12, wherein the hybrid electric gas turbine engine includes:
a gas turbine engine; and
an electric motor operably connected to the gas turbine engine to supplement operation of the gas turbine engine.

14. The propulsion system of claim 12, wherein the anti-ice system is powered by one or more of a battery, capacitor or electric motor of the hybrid electric gas turbine engine.

15. The propulsion system of claim 12, wherein the anti-ice system includes a plurality of resistive heating elements arrayed around one or more of the nacelle and the hybrid electric gas turbine engine.

16. The propulsion system of claim 15, wherein the plurality of resistive heating elements includes one or more carbon nanotube structures.

17. The propulsion system of claim 15, wherein the plurality of resistive heating elements are embedded in the material of the nacelle.

* * * * *